US012681861B2

(12) United States Patent
Madan et al.

(10) Patent No.: US 12,681,861 B2
(45) Date of Patent: *Jul. 14, 2026

(54) EXTENT READS AT RANDOM OFFSETS BY SYNTHESIZING EXTENTS TO LEVERAGE SEQUENTIAL RESTORE PERFORMANCE

(71) Applicant: Dell Products L.P., Round Rock, TX (US)

(72) Inventors: Nitin Madan, San Jose, CA (US); Donna Barry Lewis, Holly Springs, NC (US); Bhimsen Bhanjois, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 88 days.

This patent is subject to a terminal disclaimer.

(21) Appl. No.: 18/418,840

(22) Filed: Jan. 22, 2024

(65) Prior Publication Data
US 2025/0238375 A1      Jul. 24, 2025

(51) Int. Cl.
*G06F 12/0862*      (2016.01)
*G06F 12/06*      (2006.01)

(52) U.S. Cl.
CPC ........ *G06F 12/0862* (2013.01); *G06F 12/063* (2013.01)

(58) Field of Classification Search
None
See application file for complete search history.

(56) References Cited

U.S. PATENT DOCUMENTS

| | | | | |
|---|---|---|---|---|
| 10,078,555 | B1 * | 9/2018 | Kumar | ................. G06F 16/188 |
| 2020/0333971 | A1 * | 10/2020 | Madan | .................. G06F 9/3851 |
| 2022/0283997 | A1 * | 9/2022 | Gunda | ................ G06F 11/1453 |
| 2022/0326867 | A1 * | 10/2022 | Thakkar | .............. G06F 12/0253 |

* cited by examiner

*Primary Examiner* — Baboucarr Faal
(74) *Attorney, Agent, or Firm* — Staniford Tomita LLP

(57)      ABSTRACT

Improving extent-based read performance using pre-fetches by utilizing synthesized sequential extent files in a deduplication storage system. Extent information is obtained for changes between two generations (e.g., Generation 0 and Generation 1) of backup files. In a client-server system, the client will instruct the filesystem to create a new synthesized file corresponding to the extents. Upon receiving this request, a filesystem server will create the new synthesized file. The new synthesized file can be read sequentially to leverage the benefits of prefetching. The extents can be patched into a target file that may be stored on different storage using the extent information.

10 Claims, 11 Drawing Sheets

Generation 1

1206
Control Path

1208
DDBoost
Client

DDBoost Client uses
extents to request
creation of New
Synthesized File

1204
New Synthesized File as
requested by DDBoost Client

PowerProtect Data Domain
1202

100

STORAGE/BACKUP
MANAGEMENT
PROCESS
112

EXTENT BASED
PREFETCH
PROCESS
120

Synthesized
Extents File
121

102

Storage
Server

124

NETWORK STORAGE

114

NETWORK
110

104

VM STORAGE

108

DATA SOURCE

DATABASE
PROCESSES
116

106

DB
Server

200

Files represented
as a Merkle tree
of fingerprints

Chunks stored on disk

202

300

File 1 (base file)        402

Included from File 1    404

New 406

Included from File 1    404

New Synthesized file from File 1    408

400

Prefetch

500

501

Read Offset 504

506

Prefetch horizon

508
Prefetch Granularity

Read Highway

608

MB/s

606

602

604

600

Time / offset read wasted IOs due to prefetching
beyond the end of each extent reads at the beginning portion of each
extent are not benefited by prefetching

1300

Obtain Extent Information for changes between Gen0 and Gen 1 files
1302

Create a New Synthesized file corresponding to the extents upon receiving client instruction
1304

Read New Synthesized File Sequentially to Leverage Prefetch Benefits
1306

Patch Extents into Target File on Different Storage using Extent Information
1308

1005

EXTENT READS AT RANDOM OFFSETS BY SYNTHESIZING EXTENTS TO LEVERAGE SEQUENTIAL RESTORE PERFORMANCE

TECHNICAL FIELD

Embodiments relate generally to deduplication storage systems, and more particularly to improving extent read performance by using synthesized extent files.

BACKGROUND OF THE INVENTION

Data is typically backed up by copying the data from a data source to a data target or storage device or network. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

Data restores involve copying stored data from the storage target back to the data source after a data loss event on the data source. In a typical filesystem, the restore operations are aided by a read-ahead (prefetch) mechanism. The simplest form of prefetching is a read hint issued at a certain horizon from the read offset. A single read request typically issues a single prefetch request at an offset calculated from the read offset and prefetch horizon. As an example, if the read comes in at an offset 0 MB, the prefetch request is issued at the 0 MB+prefetch horizon MB. Typically, the prefetch horizon is a few MB. It is higher in the scenarios where the underlying storage layer is slower. This mechanism generally works well since the application read requests mostly find all their data already present in the read-ahead cache, and therefore need not block for I/O operations, thus considerably improving read performance.

Many applications do not read out the full files, but instead read only specific sections of a file, referred to as 'extents' of the file. Each extent is identified by its starting offset and length. Reading multiple extents from a file involves jumping from one offset to another. In this case, prefetching has limited usefulness since each jump from a current extent to the next extent means that prefetching must start again for the next extent. Furthermore, the prefetching I/Os that were issued beyond the end of the current segment are wasted.

What is needed, therefore, is a way to improve extent reads at random offsets in order to leverage the advantages of sequential restore performance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and DDBoost are trademarks of Dell EMC Corporation.

BRIEF SUMMARY OF EMBODIMENTS

Embodiments improve extent reads at random offsets by synthesizing extents into a single sequential file in order to leverage the advantages of sequential restore performance.

An extent-based prefetch system and method improves read performance in a backup system using data prefetching by utilizing synthesized sequential extent files. Extent information is obtained for changes between two generations (e.g., Generation 0 and Generation 1) of backup files. In a client-server system, the client instructs the filesystem to create a new synthesized file corresponding to the extents. Upon receiving this request, a filesystem server creates the new synthesized file. The new synthesized file can be read sequentially to leverage the benefits of prefetching that include preventing wasted input/output operations created by attempting to pre-fetch data beyond an end of an extent, or failing to pre-fetch any data at a beginning of an extent. The extents can be patched into a target file that may be stored on different storage using the extent information.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
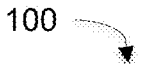
FIG. 1 is a diagram of a computing network implementing a prefetch process utilizing synthesized sequential extent files in a deduplication storage system, under some embodiments.
Figure 1:
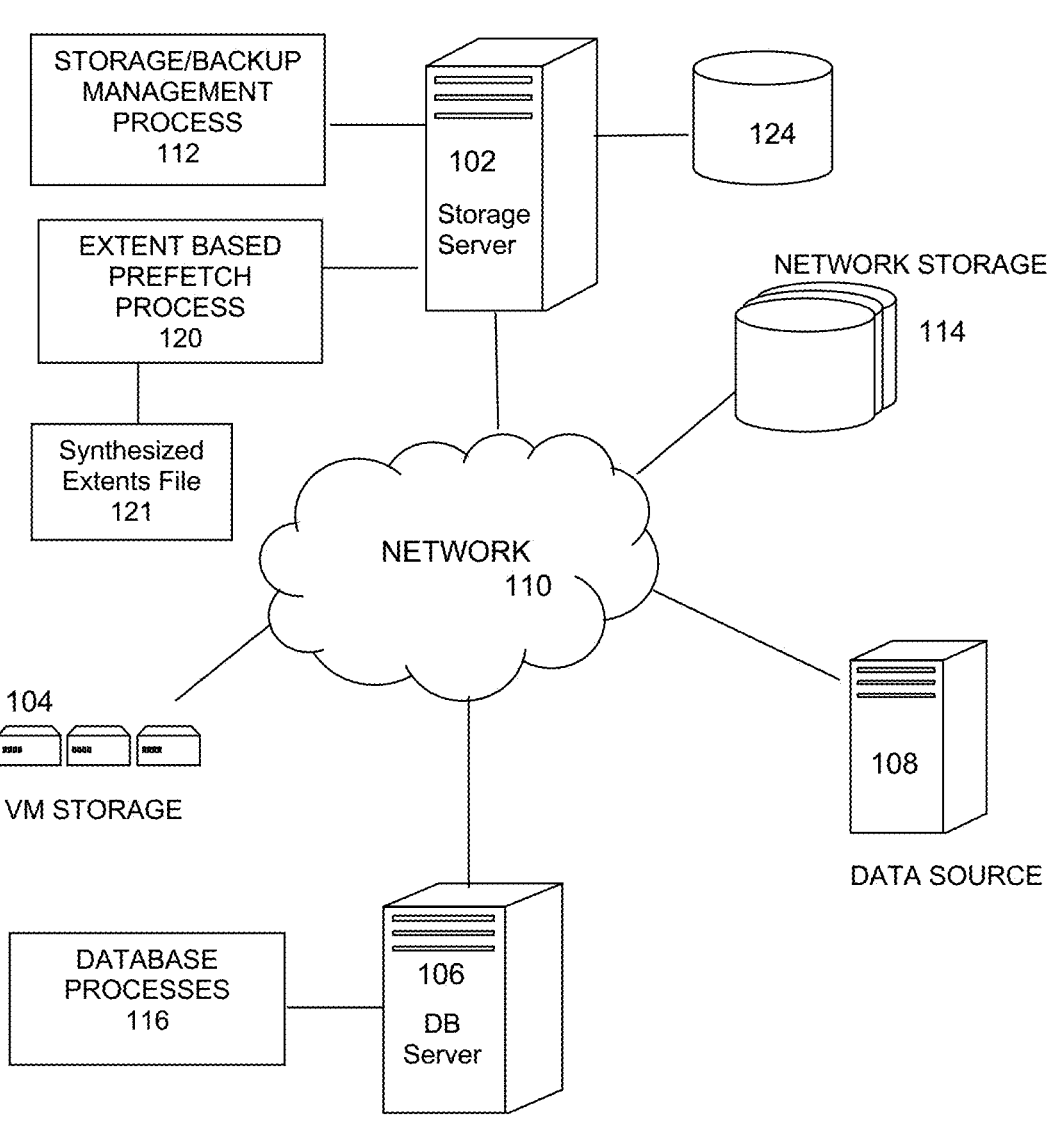

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a process for improving restore performance in deduplication backup systems. FIG. 1 is a diagram of a computing network implementing a prefetch process utilizing synthesized sequential extent files in a deduplication storage system, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The Data Domain (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
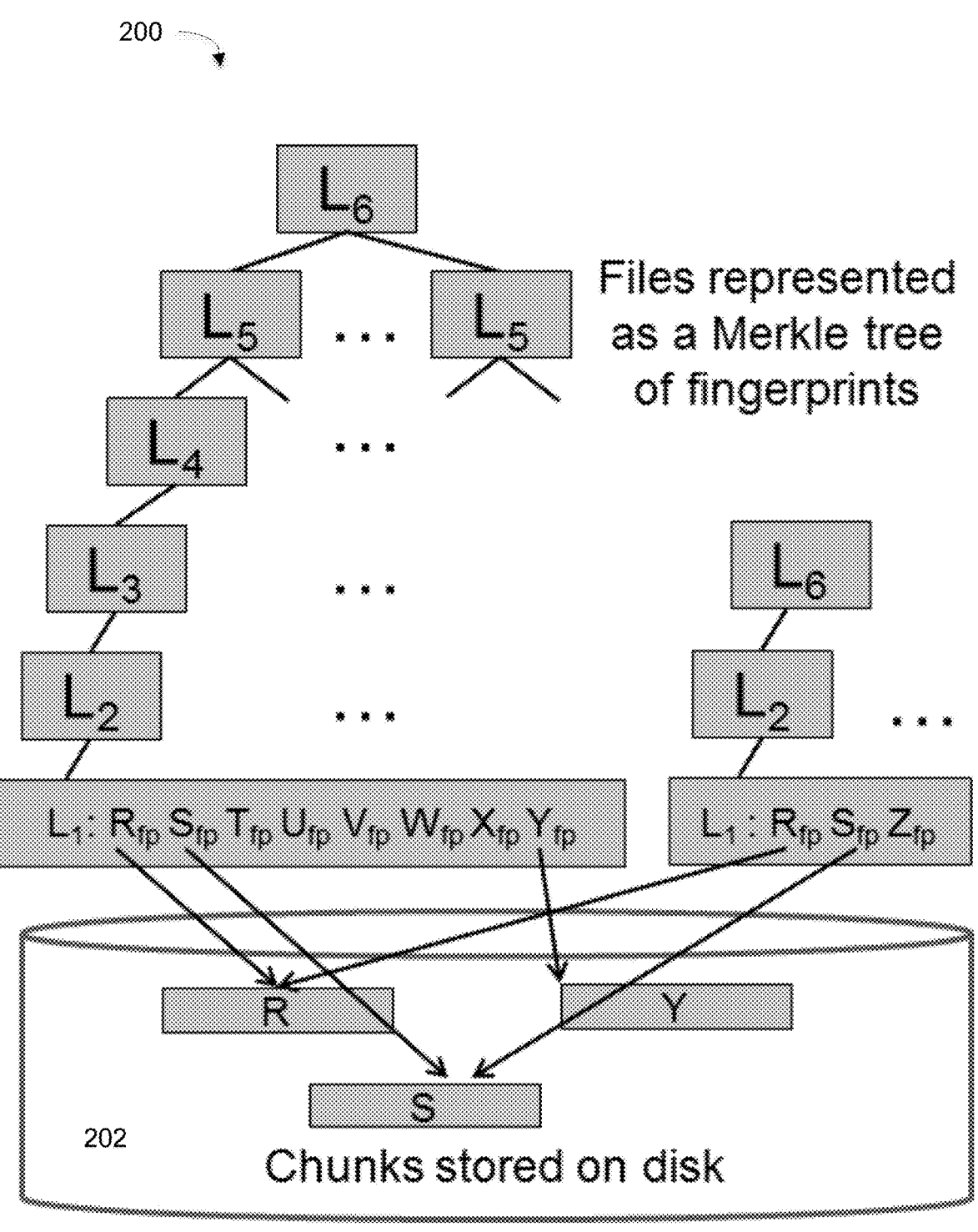
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of L fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as Lp chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, Lp chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new $L_6$ root of the tree, but that tree then references the identical LP chunks. As this operation involves only the root of the tree, it is trivially fast and does not increase physical space in use beyond the one chunk containing the $L_6$.

Figure 3:
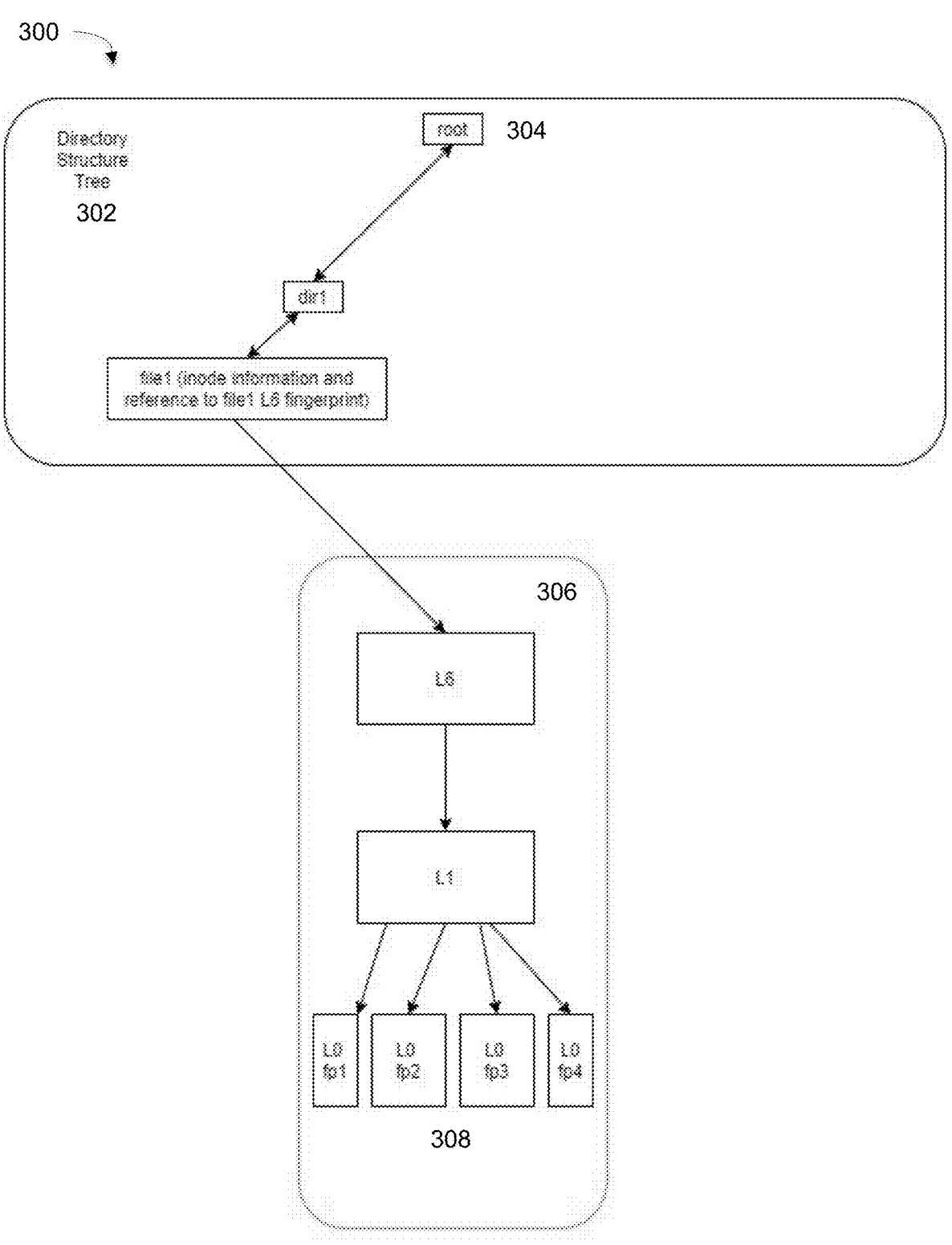
FIG. 3 illustrates a Data Domain filesystem Merkle tree accessed by a file under an example embodiment.

FIG. 3 illustrates a DDFS Merkle tree accessed by a file under an example embodiment. As shown in system 300, a directory structure tree 302 comprises a root directory 304, which accesses a directory (dir1) that holds a particular file (file1). The directory tree data for file1 comprises inode information and a reference to the file1 L6 fingerprint in the associated Merkle tree 306.

As mentioned above, the data chunks directly written to disk are referred to as $L_0$, meaning the lowest level of the tree, and which hold the respective fingerprints (fp1 to fpn). Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough to not need intermediate nodes. The $L_1$-$L_6$ chunks are referred to as Lp chunks, where p is a parameter that ranges from 1 to 6 and indicates metadata representing the file. Deduplication takes place because a chunk can be referenced multiple times. The filesystem is a forest of Merkle trees, but these trees are not disjoint, particularly at the lowest level.

Various different backup types may be implemented by system 100, such as full backups, incremental backup, synthetic backups, and so on. A virtual synthetic backup is a method whereby an incremental backup file is stitched together with the last full backup file to create a new backup file that includes portions of the incremental file and the last full backup. The last full backup file is typically called the base file and the incremental file is called the increment.

Figure 4:
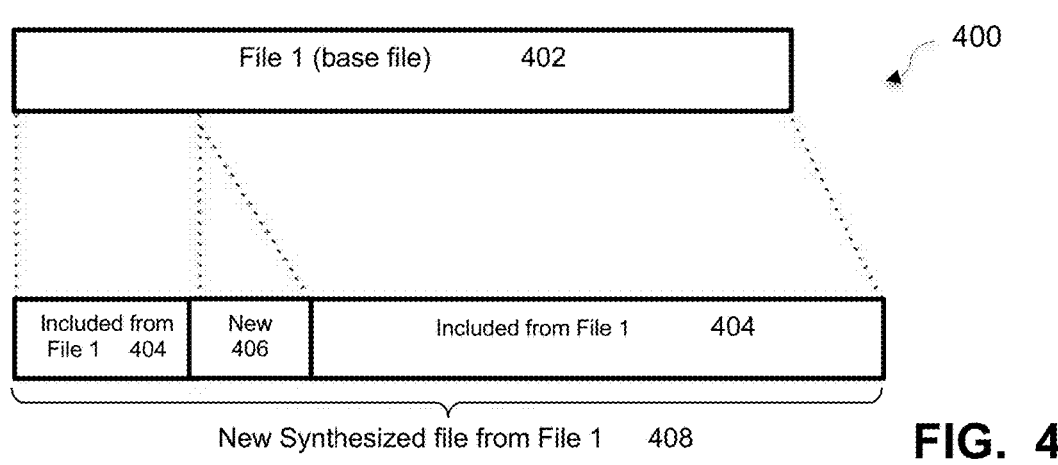
FIG. 4 illustrates an example of a virtual synthetic backup, under some embodiments.

FIG. 4 illustrates an example of a virtual synthetic backup, under some embodiments. As shown in diagram 400, a base file, File 1 (402) represents a last full backup of a file which has then been modified by the addition of new data prior to a next incremental backup. In this case, after a virtual synthetic backup, the original full backup portions of file 1 404 are stitched together with the new backup data 406 added since the previous backup.

DDFS is configured to supports virtual synthetic backups using special APIs that can stitch the new file tree, which will copy portions (Lps) into a new Merkle tree. Being a deduplication filesystem, this is efficient because all that is needed is to copy and manipulate metadata.

The virtual synthetics APIs are very flexible in that they allow for includes of any length of data from any file (or any number of files) into the target file (e.g., 408). Semantically, the client (e.g., a DDBoost client) would issue these requests such as: ddp_synthesize_file(source_file, destination_file, destination_offset, source_offset, extent_length). Essentially, this command would include the file segment from the source file, at source_offset for extent_length, into destination_file, at the destination_offset.

Prefetch Operations

Figure 5:
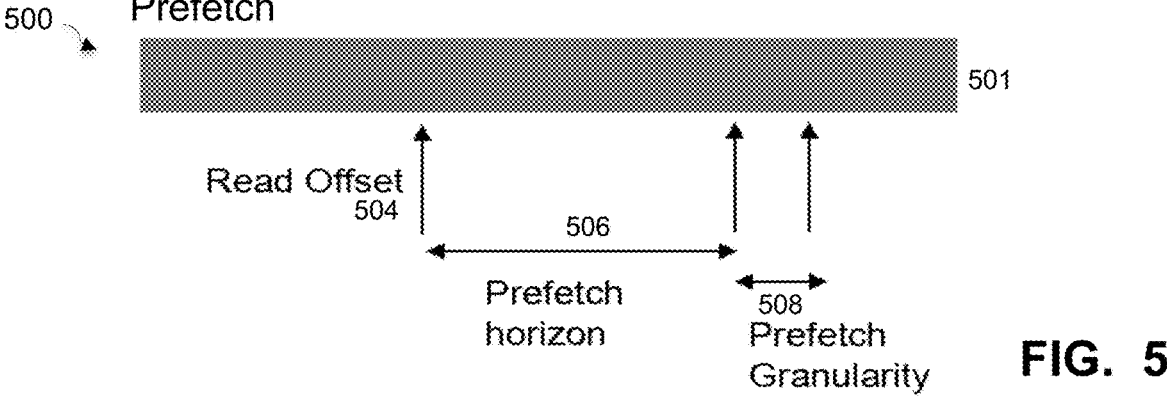
FIG. 5 illustrates a prefetch operation that is adopted for use with an extent-based prefetch process, under some embodiments.

As mentioned in the background section above, in a typical filesystem (e.g., DDFS), data restores are aided by a read-ahead (prefetch) mechanism, such as a read hint issued at a certain horizon from the read offset. A single read request typically issues a single prefetch request at an offset calculated from the read offset and a set prefetch horizon. FIG. 5 illustrates a prefetch process that is adopted for use with synthesizing extent files to improve file restores, under some embodiments. FIG. 5 shows certain prefetch parameters defined for a horizontal axis 501 denoting memory capacity in megabytes (MB), or any similar unit of storage). As shown in FIG. 5, for a prefetch request issues at a point after an application's read request as defined by a read offset 504 and a prefetch horizon 506. As shown in the example scenario of diagram 500, a read comes in at a read offset 0 MB, and a prefetch request is issued at the 0 MB plus the prefetch horizon value in MB. Typically, the prefetch horizon 206 is on the order of 30 MB or so (e.g., between 15 to 50 MB), and is higher when the underlying storage layer is slower, although any value is possible.

The prefetch granularity 508 shown in the example of FIG. 5 is on the order of 1 MB for a prefetch horizon of 30 MB. The prefetch granularity is the size of the prefetch I/O operation. In large sequential reads, it is typically 1 MB for one example, though other sizes are also possible. Likewise, the read offset 504 is typically 0, but can be any other practical value.

The prefetching operation 500 can be for any file or data restore process that comprises an application issuing a file open request followed by a plurality of read and write requests and a file close. In this context, the prefetch 500 moves data from a prefetched file into a read-ahead cache to be sent to a read request consumer of the filesystem. Any similar operation that uses a prefetch mechanism as a hint to indicate upcoming reads may also be used.

Without the benefit of a prefetch process 500, each read request becomes a blocking read (i.e., block pending I/O operations), and is limited by the backend storage performance, thus at least some degree of data pre-fetching is usually desired to reduce I/O blocking and improve file restore performance.

As read operations copy data out from memory, the prefetches 500 do the actual work of reading data from the storage layer. As the reads periodically catch up with the prefetches, these reads block I/Os until the data becomes available. During this time, however, the prefetches that have been issued out already by the previous reads get time to perform their I/Os and load data into memory. This ensures that the subsequent read requests do not block I/Os until a read again catches up with the prefetch. This cycle continues throughout the restoration of a file, and since most of the reads are getting served out of memory, throughput improvement is significant at least in the case of relatively long 'read highways.'

Figure 6:
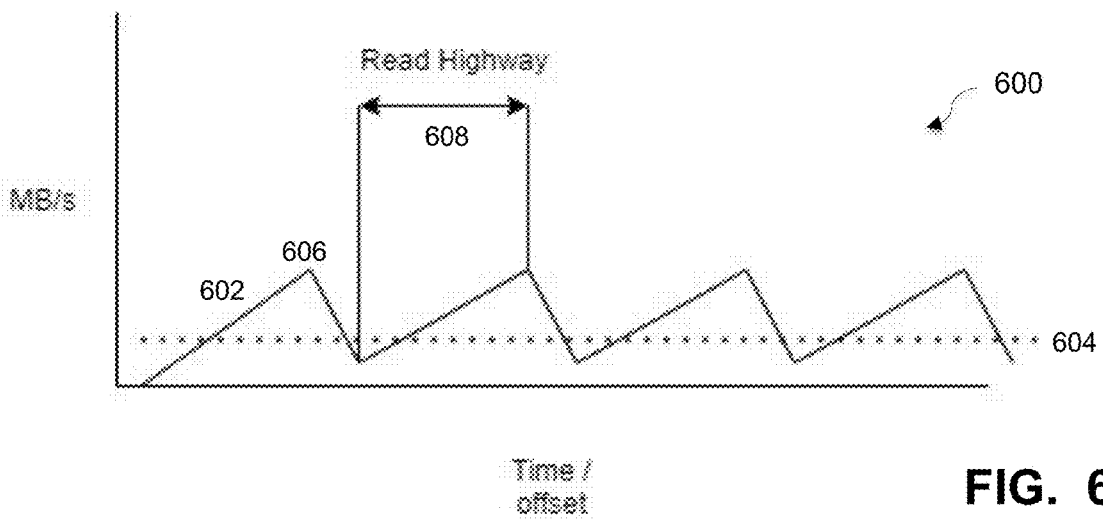
FIG. 6 illustrates an example plot of a read highway formed by slow and fast reads in a data restore system.

As mentioned, prefetches at the prefetch horizon bring data into memory just as application reads catch up, which happens frequently due to slow disk I/O, and other factors. FIG. 6 illustrates an example plot of slow and fast reads for a system that accesses both fast memory and slow disks. FIG. 6 illustrates a graph 300 over a Y-axis measuring data transfer throughput in MB/s, and an X-axis measuring Time/offset read. The dimensions of graph 600 demonstrate that sequential read requests come to the ordered increased offsets for the file, i.e., the file is being read from offset 0 till the end of the file. This is also happening with a monotonically increasing clock.

As shown in FIG. 6, the graph between I/O being read out of memory and read off the disk (i.e., fast reads versus slow reads) appears as a sawtooth pattern plot 602. As a result, the average read performance (604) is a fraction of the peak read performance 606. Here, the distance between the time spent between the stalls is defined as a read highway 608. The system's restore performance is directly proportional to the length of the read highway, and the key to good sequential read performance is to keep the read highways as long as possible.

Extent-Based Reads

Figure 7:
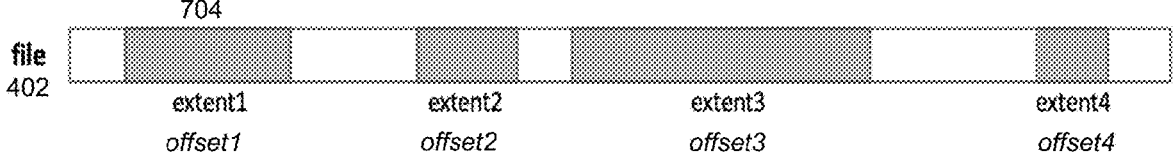
FIG. 7 illustrates an example of extent-based reads.

Certain use-cases require the application to perform extent-based reads, rather than sequential reads of the entire file. Extent-based reads involve reading several regions of the file sequentially but the regions themselves are not contiguous. FIG. 7 illustrates an example of extent-based reads. As shown in FIG. 7, portions 704 represent extents that are read from the file 402.

Figure 8:
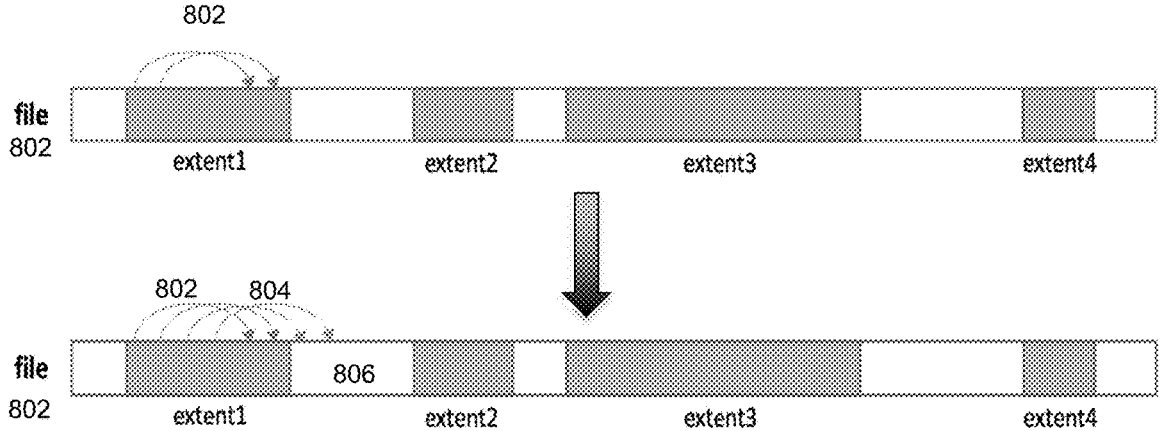
FIG. 8 shows an example prefetch offset corresponding to a read offset.

In general, a naïve prefetching mechanism based on a simple prefetch horizon does not work effectively for extent-based reads, as shown in FIG. 8. FIG. 8 shows an example prefetch offset corresponding to a read offset. For the example of FIG. 8, a prefetch is illustrated as an curved arrow for a read starting within an extent and going forward in the file. As shown for file 802, the beginning of the curved arrows 802 indicate the offset of the read while the end of the arrow indicates the prefetch offset calculated based on the prefetch horizon, where prefetches corresponding to the first two reads fall inside the same extent, i.e., extent1.

In a simple prefetch, the prefetches corresponding the next few reads may fall beyond the extent and into a gap in the file that the application is not interested in reading. This results in wasteful I/Os and does not load up the initial part of the next extent that the application is next going to read. This can be seen in FIG. 8 where the prefetches 804 for the next two reads (after 802) fall within gap 806 and not extent2.

Figure 9:
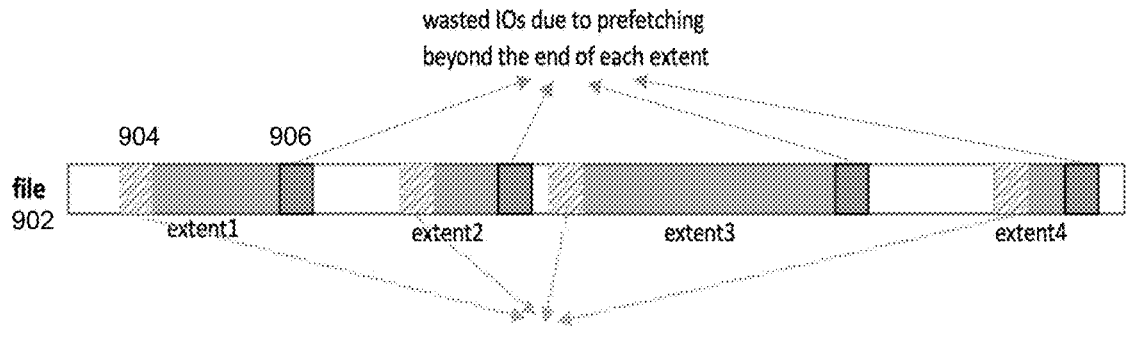
FIG. 9 illustrates issues of pre-fetching that are remedied with an extent-based prefetching mechanism, under some embodiments.

A present, non-extent-aware prefetching mechanism is thus ineffective due to the fact that (1) the prefetch IOs issued beyond the end of an extent are wasteful I/Os and the prefetched data is not used at all, and (2) the reads at the beginning of each extent do not benefit from any kind of prefetching as the prefetching mechanism is operating further down the extent. These situations are shown in FIG. 9 for file 902. FIG. 9 illustrates issues of pre-fetching that are remedied with an extent-based prefetching mechanism, under some embodiments. As shown in FIG. 9, an end region 906 of each extent produces wasted I/Os due to prefetching beyond the end of an extent (as shown in FIG. 8), and reads from a beginning region 904 of each extent are not benefitted by prefetching. Accordingly, in present methods of processing extent-based reads, the prefetching benefits are lost.

Embodiments include a process that synthesizes a new file with all the extents to produce a synthesized extent file 121 from the extent-based prefetch process 120. In an embodiment, process 120 uses certain facilities of a backup client, where the extent information to be requested is known to the client. In some cases, some knowledge of the extents associated with a backup are known (e.g., new extents since the previous backup). On a restore request, the client gathers the extent information and then requests the reads on the given file extents. The client may use the read extent data to create a full copy by patching the extents into the previous full backup.

In an embodiment, read requests are sent through a common library software plug-in to access the files in the filesystem (DDFS), where the plug-in is implemented using DDBoost. When so enabled, the application becomes a "DDBoost client." DDBoost refers to the DellEMC Data Domain Bandwidth Optimized Open Storage Technology (OST), and is a library that links with an application to reduce the bandwidth required by ingests. This method translates the application read and write requests to DDBoost APIs.

DDBoost distributes parts of the deduplication process to the backup server or application clients, enabling client-side deduplication for faster, more efficient backup and recovery. A data storage deployment may use any combination of interfaces simultaneously to store and access data. The DDBoost clients use the DDBoost backup protocol to conduct backups of client data to the appliance pool, restore the backups from the appliance pool to the clients, or perform other data protection operations. The DDBoost library exposes APIs to integrate with a Data Domain system using an optimized transport mechanism. These API interfaces are exported by the DDBoost Library to provide mechanisms to access or manipulate the functionality of a Data Domain file system.

Figure 10:
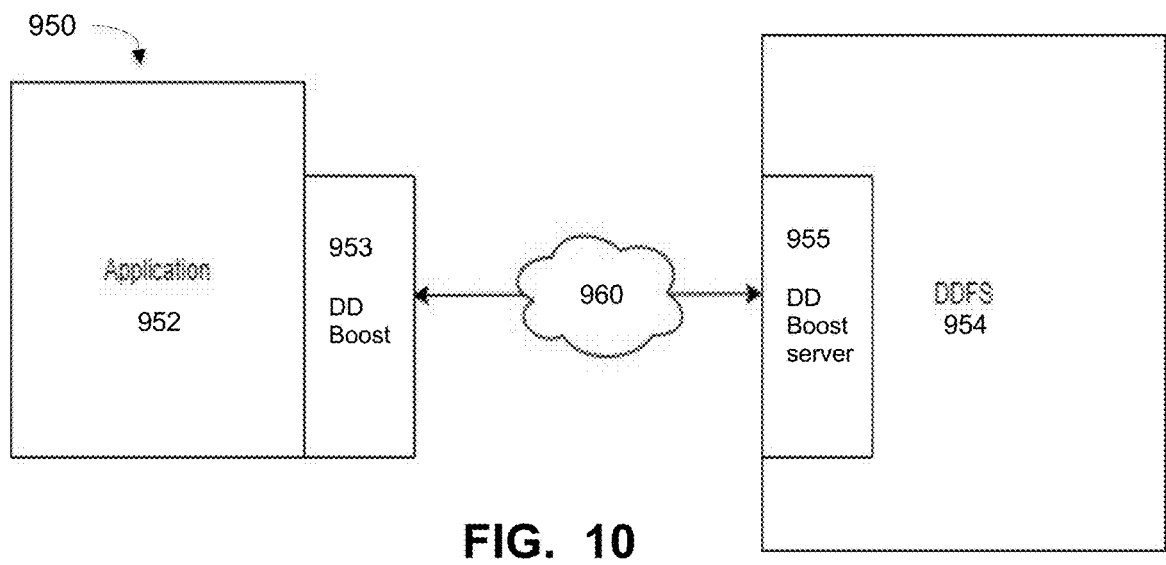
FIG. 10 illustrates the use of DDBoost APIs in conjunction with a DDFS system, under some embodiments.

FIG. 10 illustrates the use of DDBoost APIs in conjunction with a DDFS system, under some embodiments. As shown in FIG. 10, for a backup application, client-side DDBoost library 953 interacts over network 960 through the DDBoost API to the DDFS system 954 through a DDBoost server process 955. For an ingest or restore process, the application 952 issues an open file, which is followed by a series of read or write requests, which are then followed by a file close.

Following is a generic example of a DDBoost API, to open a file and specify the operation, in this case for reading.

boost_open_file (file path, FLAG=FOR READING, &file handle);

This would be followed by read requests:

boost_read(file handle, offset, length, &buffer);

The DDBoost library offers additional options for opening/reading, but the above simply provides a generic interface with parameters needed to support client-side deduplication.

Figure 11:
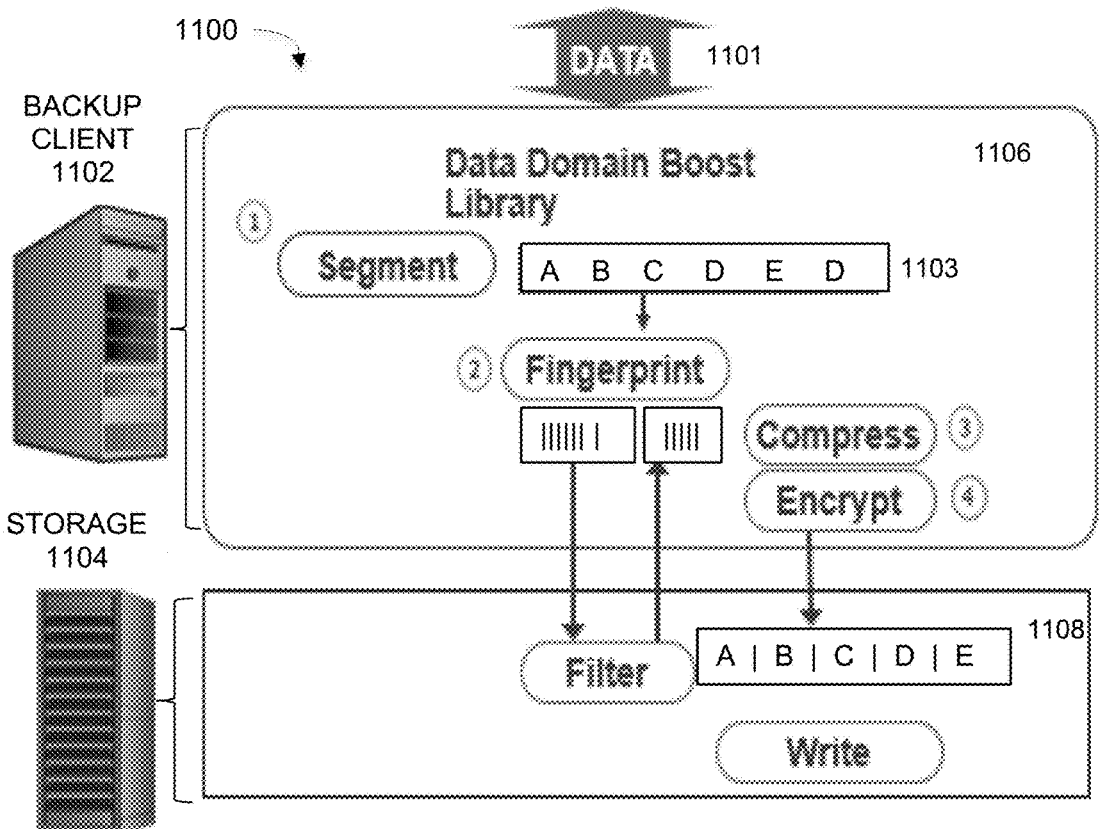
FIG. 11 illustrates a process of performing distributed or client-side inline deduplication using a DDBoost library, under some embodiments.

FIG. 11 illustrates a process of performing distributed or client-side inline deduplication using a DDBoost library, under some embodiments. As shown in FIG. 11, system 1100 includes a backup client 1102 that sources data to be backed up to network storage 1104, such as a PowerProtect system. As data 1101 is ingested by the backup process, the backup client 502 utilizes the DDBoost library 1106 to perform the following processing stages: (1) calculate where to break the data 501 into segments 1103 (e.g., rolling checksum); (2) perform a fingerprint (reference) calculation (e.g., SHA1 hash value); (3) compress the data segment; and (4) encrypt the data (when configured to do so). The DD Boost library sends the hashed fingerprints for filtering to the Data Domain system, queries for the filtering results, and then compresses and sends data identified as new. These steps continue for the duration of the processing.

Some specific embodiments are described in conjunction with storage systems, products, and services referred to as Data Domain as provided by Dell EMC. It should be appreciated, however, that the described systems and techniques can be applied to other similar storage systems, products, and services. For example, some specific embodiments are described in conjunction with the DDBoost protocol. Aspects and principles of embodiments described, however, are applicable to other protocols such as NFS, CIFS, and others.

Synthesizing Extents

As described above with respect to FIG. 9, one issue with current methods of processing extent-based reads is that the prefetching benefits are generally lost completely. Embodiments of process 120 utilize certain features of synthetic backups and the DDBoost protocol to synthesize a file 121 with all of the extents to thereby improve extent reads at random offsets to leverage sequential restore performance.

Backups are written in generations (or versions). A difference (or 'delta') between subsequent generations of backups yields the changes in the files. These deltas can be represented as set of offset/length pairs. Many filesystems have utilities or APIs that can be used to generate the deltas or differences between any two files.

During normal extent processing, the extent information to be requested is known to the client. Upon a restore request, the client gathers the extent information and then requests the reads on the given file extents. The client may use the read extent data to create a full copy by patching the extents into the previous full.

Figure 12A:
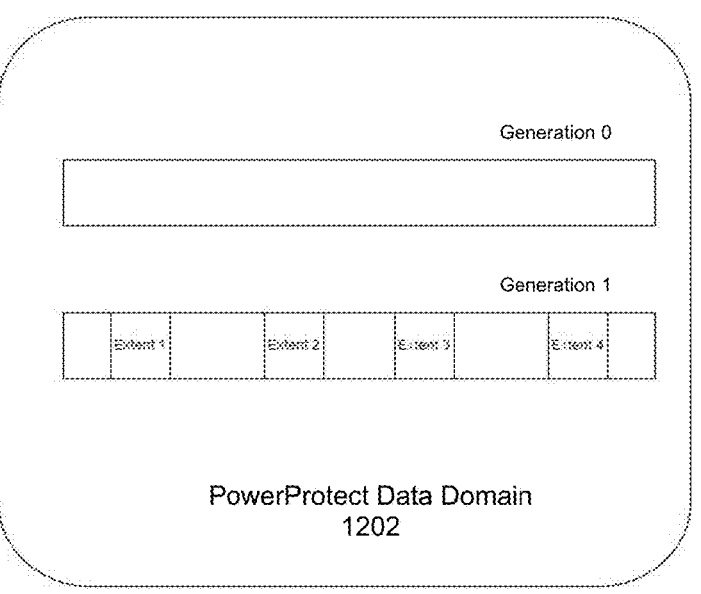
FIG. 12A, illustrates two generations of backup copies in a PowerProtect Data Domain system under an example embodiment.

For example, assume that there are two generations of data ingested. Generation 0 is the first copy of the data, and Generation 1 is the same data, but has four changes (Extent 1 through 4), such as shown in FIG. 12A, which illustrates two backup copies in a PowerProtect Data Domain (PPDD) system 1202, under some embodiments. The file corresponding to Generation 1 could be ingested as is, or it could be created using synthetic full backup techniques. Assume, for this example, that the client knows the offset, length information for the extents (Extent 1 through 4). Traditionally, if the intent of the application is to read only the new data associated with Generation 1, the reads on the extents would be to seek to the start of Extent 1 and read all the way to the end of Extent 1, and then seek on to the next extent. It could be that the Generation 0 file resides on another storage device, and the extents are being read out to patch and create an equivalent of the Generation 1 file. This patching is managed by the backup software, which links with the DDBoost client. As mentioned previously in the Background section, this present method suffers from the fact that reading multiple extents from a file involves jumping from one offset to another, thus limiting the usefulness of prefetching since each jump forces prefetching to start again for a next extent.

Figure 12B:
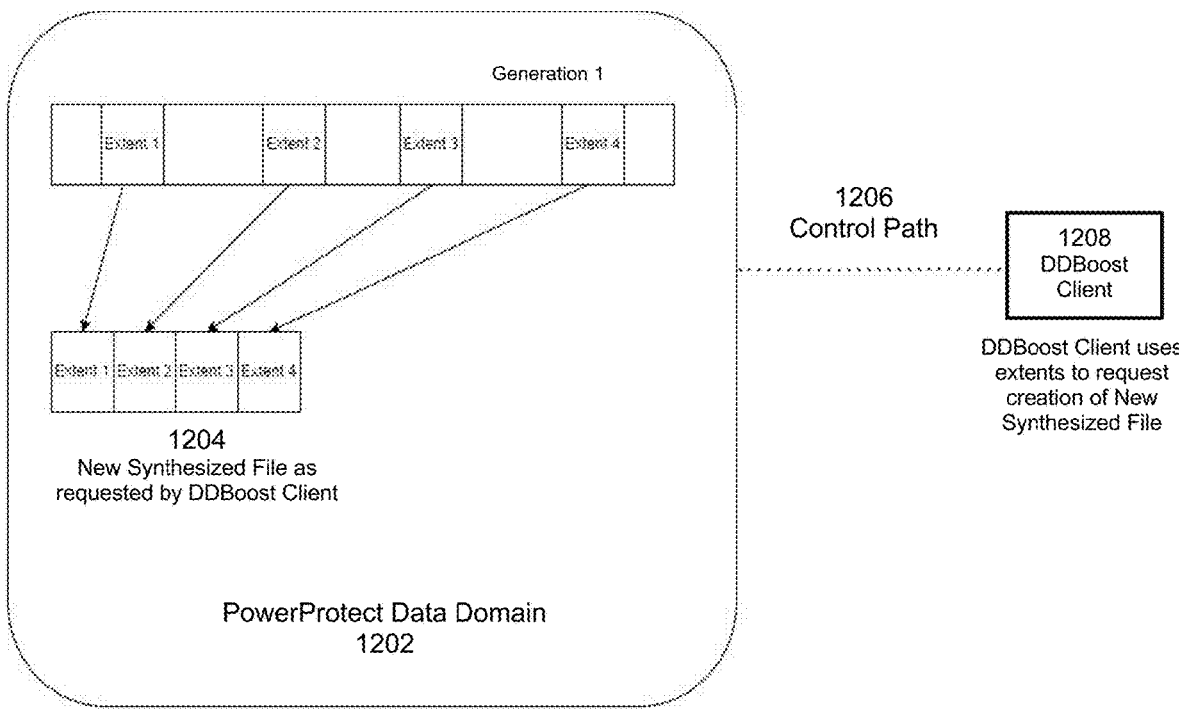
FIG. 12B illustrates a system creating a synthesized full files using extent information, under some embodiments.

In an embodiment, process 120 creates a synthesized full file using the extent information. FIG. 12B illustrates a system creating a synthesized full files using extent information, under some embodiments. As shown in FIG. 12A, PPDD system 1202 is coupled to a DDBoost client 1208 over a control path 1206. The PPDD contains the Generation 1 file having four extents (Extent 1 to 4) as shown in FIG. 12A. For this embodiment, the DDBoost client 1208 instructs the filesystem to create a new synthesized file corresponding to the extents over the control path 1206. The PPDD 1202 then generates a new synthesized file 1204 as requested by the DDBoost client.

The new file 1204 includes only extents (the delta information). This new synthesized file 1204 can then be read sequentially. Since this file can be read in its entirety end-to-end, the prefetching efficiencies which are built into the filesystem will be leveraged, and the read performance will be superior to present methods that jump between extents. In this manner, there are no wasteful prefetch I/O operations.

The backup software linking with DDBoost client 1208 will know where a current extent ends, and where to patch it in the target file. In an embodiment, this knowledge is provided because the extent information can be returned as part of the DDBoost API to read the synthesized file. The API will include the read buffer along with the extent (offset/length) associated with the data. For example: boost_read_extent_file(filehandle, & extent_array, & buffer).

Figure 12C:
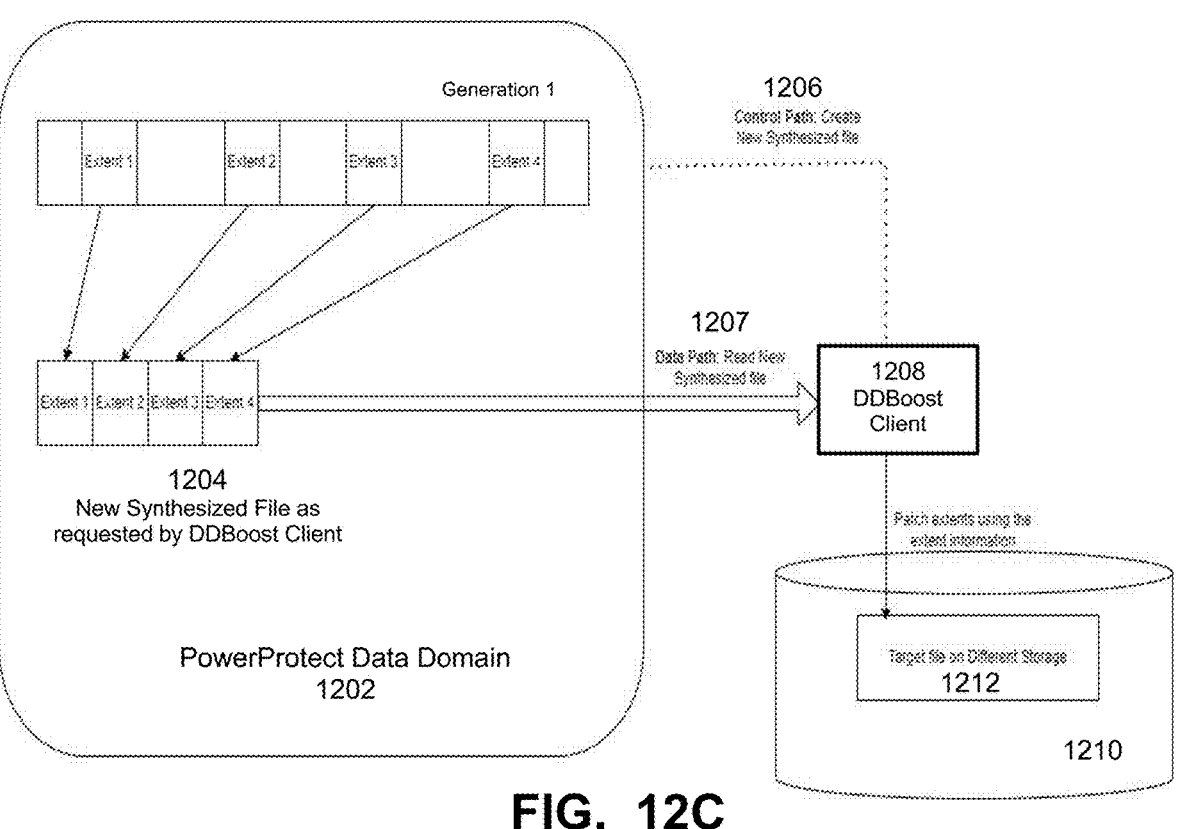
FIG. 12C illustrates the system of FIG. 12B utilizing a target file on different storage.

FIG. 12C illustrates the system of FIG. 12B utilizing a target file on different storage. As shown in FIG. 12C, the extents in the Generation 1 file are synthesized into a new synthesized file 1204 as requested by the DDBoost client 1208 over control path 1206. This new synthesized file is then read by the DDBoost client using data path 1207. The extents are patched using the extent information to a target file 1212 on different storage 1210.

The case of retrieving differences between a backup file and its previous backup (Gen0/Gen1) described above rep- resents one example use case, and many others are also possible, including those that do not need to patch the extents into a target file. One additional use case includes retrieving a sparse virtual disk backup file. When a sparse virtual disk is stored, the file is the size of the disk, however data typically only resides in specific regions. When this file is backed up to the PPDD system it is stored as data segments intermixed with segments representing holes between these regions. To maintain this sparseness when retrieving the virtual disk image and limit bandwidth when reading this disk back over the network, the application only reads regions where data resides. In present methods, the application maintains metadata showing where actual data resides within a sparse virtual disk. When retrieving the disk, the application randomly reads locations in the backup file where data resides. This results in randomly reading data within the PPDD system. In an embodiment of synthesizing an extent file to leverage sequential restore performance, the application synthesizes data from locations in the backup file where data resides, and then reads this file sequentially.

Another example use case involves restoring application specific backup files with embedded metadata. Many backup applications maintain a proprietary method of creating backup images. This can be done to enable them to leverage other features of their product (e.g., replication deduplica- tion, auto-catalog, etc.). When restoring backups, the meta- data within the files is read back to provide the application with information needed to reassemble the backup file. In present methods, applications storing backup files embedded with metadata will read this embedded metadata out to understand how to act on the file (e.g., reassemble, replicate, catalog, etc.). This results in randomly reading files within the PPDD system. Using embodiments of the synthesized extent method, the application synthesizes metadata from backup files and then reads this single synthesized file sequentially to understand how to act on the file (e.g., reassemble, replicate, catalog, etc.). This provides some examples of possible use cases, and other use cases are also possible.

Figure 13:
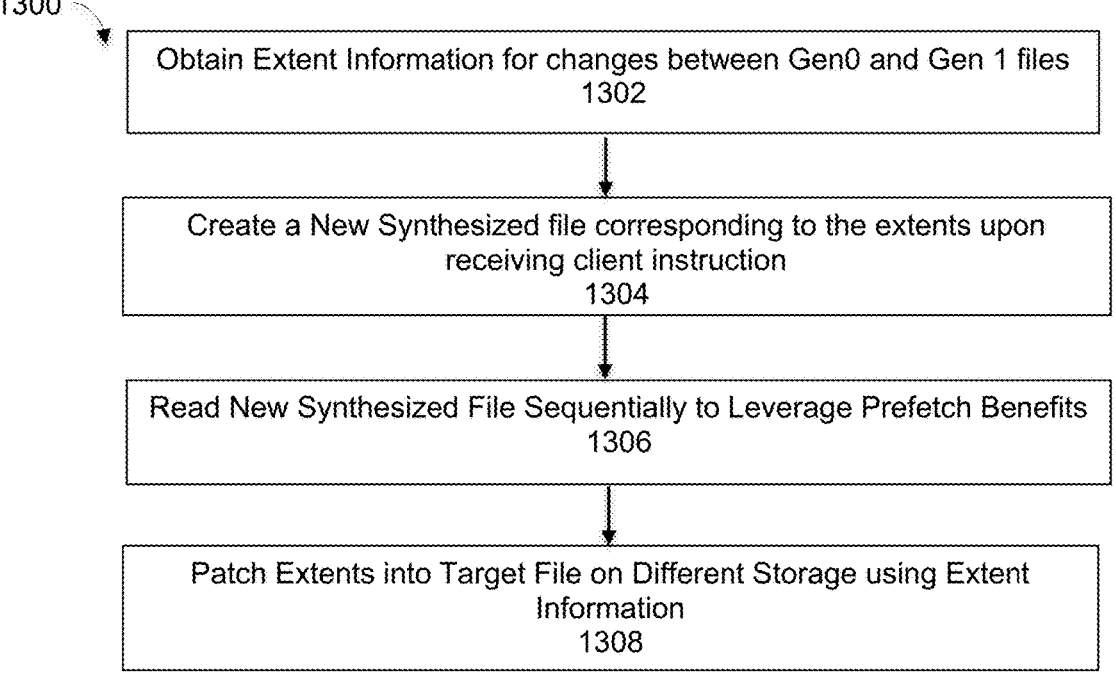
FIG. 13 is a flowchart illustrating an overall process of implementing a prefetch process utilizing synthesized sequential extent files in a deduplication storage system, under some embodiments.

FIG. 13 a flowchart illustrating an overall process of implementing a prefetch process utilizing synthesized sequential extent files in a deduplication storage system, under some embodiments. As shown in FIG. 13, process 1300 starts, in step 1302, with obtaining the extent infor- mation for changes between two generations (e.g., Genera- tion 0 and Generation 1) of backup files, such as shown in FIG. 12A. In a client-server system, the client will instruct the filesystem to create a new synthesized file corresponding to the extents, and upon receiving this request, the system will create the new synthesized file, 1304. The new synthe- sized file can be read sequentially to leverage the benefits of prefetching, 1306. The extents can be patched into a target file that may be stored on different storage using the extent information, 1308.

Figure 14A:
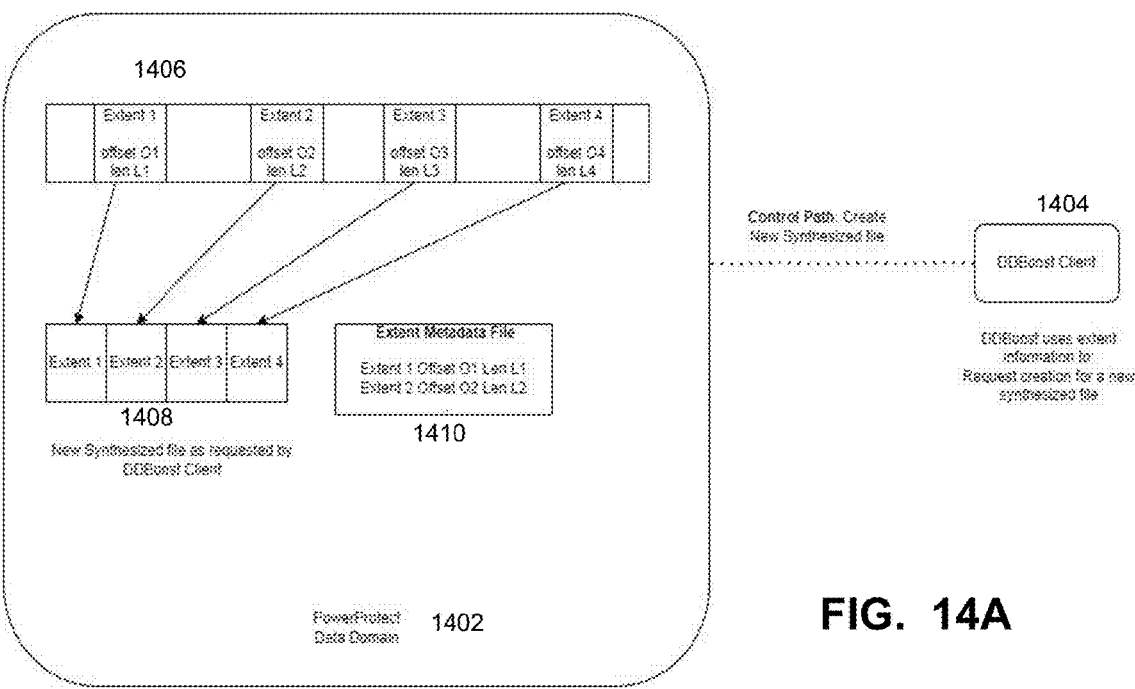
FIG. 14A illustrates a new synthesized file for extents using an extent metadata file, under some embodiments.

FIG. 14A illustrates a new synthesized file for extents using an extent metadata file, under some embodiments. FIG. 14A illustrates a PPDM system 1402 that creates a new synthesized file 1408 for transmission to the DDBoost client 1404. The extent file 1408 having Extent 1 to Extent 4, as shown, are synthesized from the extents in the file 1406 as they may be separated by gaps in the data. Each extent is defined by a corresponding offset/length pair, such s offset 01, length L1 for Extent 1, and so on. The synthesized file 1408 comprises the extents in a single sequential set of data (the extents are concatenated with each other), and an extent metadata file 1410 stores the each extent and its correspond- ing offset/length pair.

Figure 14B:
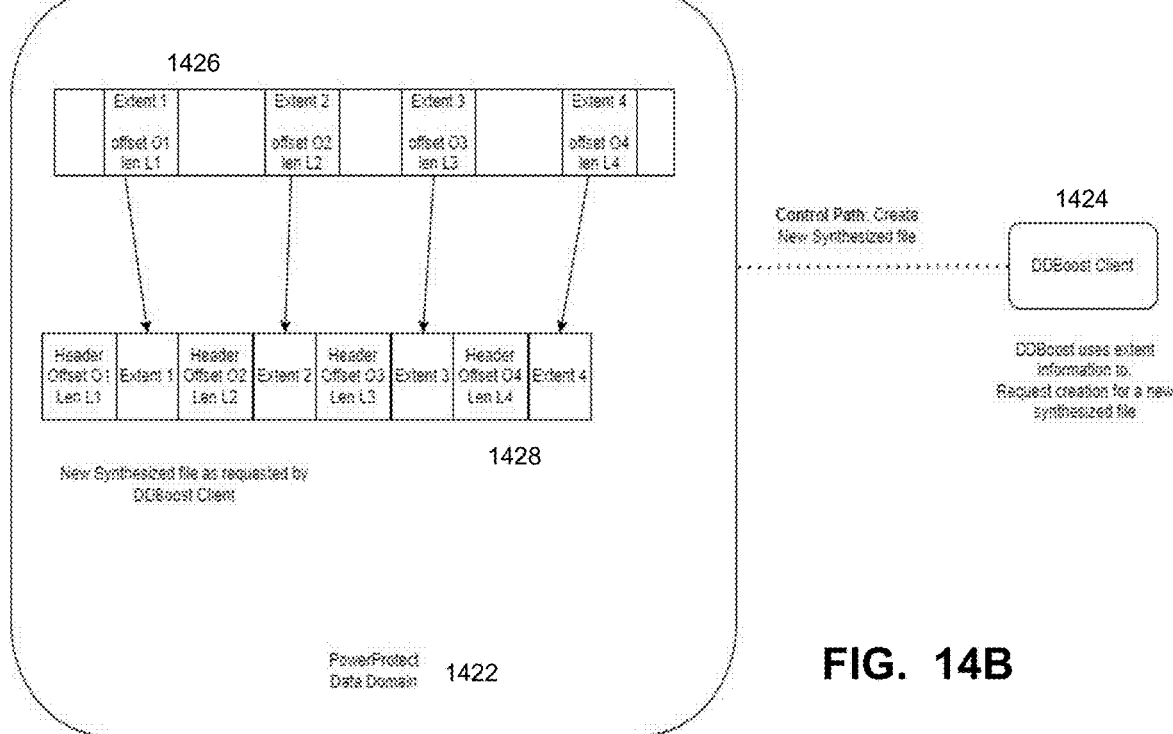
FIG. 14B illustrates interleaving header information for extents to create a new synthesized file, under some embodiments.

In an embodiment, this process can interleave marker information or have file headers corresponding to an extent map. These markers or headers can be used to enable DDBoost to create the extent array when responding to the read request, or the application itself can simply use them to identify each extent within the returned data. FIG. 14B illustrates interleaving header information for extents to create a new synthesized file, under some embodiments. FIG. 14B illustrates a PPDM system 1422 that creates a new synthesized file 1428 for transmission to the DDBoost client 1424. In this case, the extents in file 1428 are interleaved with headers that include the respective offset/length infor- mation for each following extent. The header may be configured as any suitable alphanumeric string differentiat- ing the extents from one another.

In this case, the extent map comprises a recipe consisting of a sequence of offsets, with each offset defining a corre- sponding extent, and the extent information comprises a sequence of offsets and lengths, with each offset and length pair defines a corresponding extent of data added to a first file to make a second file.

Along with the traditional filesystem prefetching tech- niques, this method also benefits from advanced prefetching techniques (on the PPDD) like Multi-Stream Restores (MSR), which is an aggressive read-ahead mechanism for improving performance of reads by using multiple streams to issue read-ahead operations in parallel. MSR opens mul- tiple internal streams for each external read stream and uses a read-ahead cache to serve the user I/Os. The benefits of this method are a larger read ahead cache (that results in longer read runways), and increased parallelism, which avoids longer queues (and queue delays) in the bottom layers.

The multi-stream restore process divides the offset range to be read into multiple chunks and assigns one chunk to each internal thread which is operating on its own internal stream. Each internal thread issues read-aheads to populate the internal cache while also issuing prefetches on the subsequent chunk that it will soon read. The prefetch offset calculation considers the chunk-based division among the internal threads and appropriately calculates the prefetch offset for each stream. Note that these calculations assume strictly sequential reads. It should be noted, however, that these calculations will fail if the reads are extent-based, since both the read-aheads and prefetches may fall outside extents. In the traditional extent-based read approach MSR would tear down on an extent jump, thus incurring addi- tional overhead.

Figure 15:
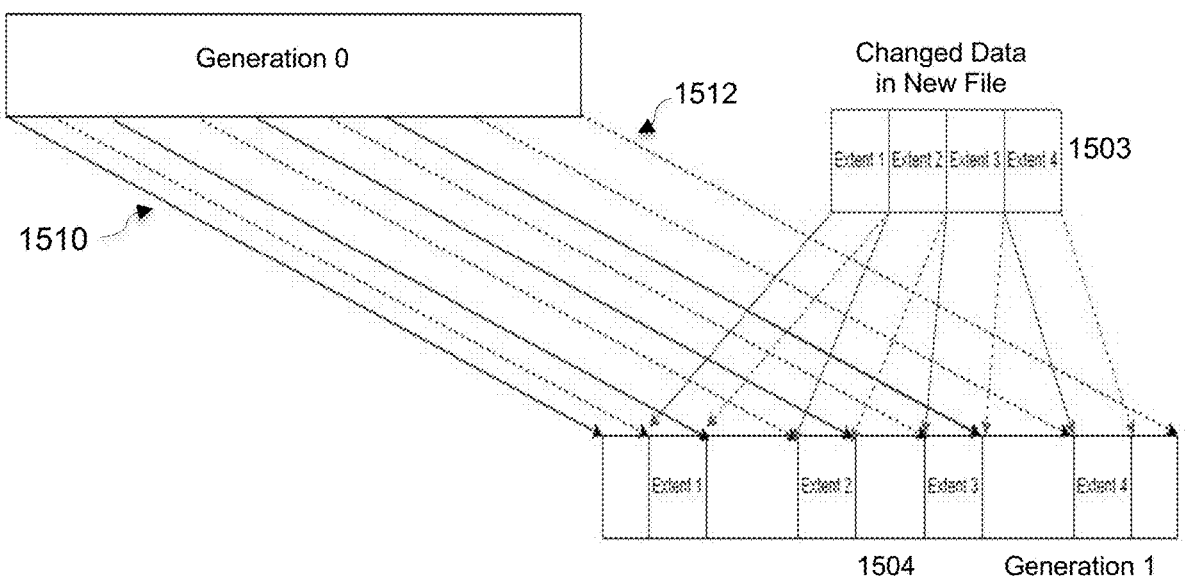
FIG. 15 illustrates a system that synthesizes extents into a new file as part of a backup operation using Change Based Tracking (CBT), under some embodiments.

In an embodiment, the extents can be stored in a file as part of the backup. For this embodiment, a Change Block Tracking (CBT) system can be used to transfer the changed data as a new file on to the PPDD system and the changes are then synthesized into the backup file. FIG. 15 illustrates a system that synthesizes extents into a new file as part of a backup operation using CBT, under some embodiments.

As shown in FIG. 15, the Generation 0 file is changed to form the Generation 1 file 1504 with extents between some of the original content. The solid lines 1510 from the Generation 0 file indicate the start of the include segment, and the dashed lines 1512 indicate the end of the include segment. The Generation 1 file 1504 of the backup is created by including the prior generation (Generation 0) and the changed data file 1503. After the changed data file lands on the PPDD, the client instructs the filesystem to synthesize a new file 1504 (Generation 1) by including the correct segments at the correct offsets.

Once the synthesis is done, the changed data file is deleted. In an implementation, the changed data file can be retained, since the data is deduplicated and there is very little cost of keeping this new data file. The changed data file 1503 represents the extent file as described with respect to FIG. 12B, and can therefore be processed as a sequential data file to leverage prefetches, as described above.

Figure 16:
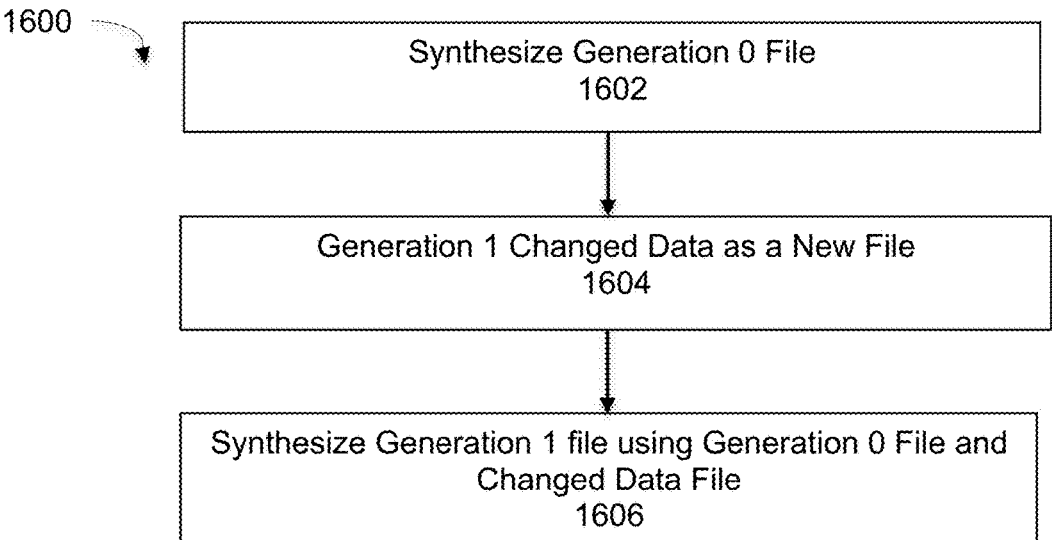
FIG. 16 is a flowchart illustrating a process of synthesizing extents into a new file as part of a backup operation using CBT, under some embodiments.

FIG. 16 is a flowchart illustrating a process of synthesizing extents into a new file as part of a backup operation using CBT, under some embodiments. Process 1600 of FIG. 16 starts with synthesizing the Generation 0 file, 1602. The changed data for Generation 1 is then saved in a new file, 1604. The Generation 1 file is then synthesized using the changed data file and the Generation 0 file, 1606. For certain workloads, the changed data file can then be unlinked and then retained or ultimately deleted, as desired.

Embodiments have thus been described for a method and system to improve extent reads at random offsets by synthesizing the extents to leverage the sequential restore performance. The method enables an extent read workflow to be supported on a storage system without the added cache typically required to achieve sufficient random read performance. The method leverages delta files to improve read performance for extent reads, and improves extent reads by synthesizing content into a inode-less file.

Embodiments of the processes and techniques described above can be implemented on any appropriate backup system operating environment or filesystem, or network server system. Such embodiments may include other or alternative data structures or definitions as needed or appropriate.

Figure 17:
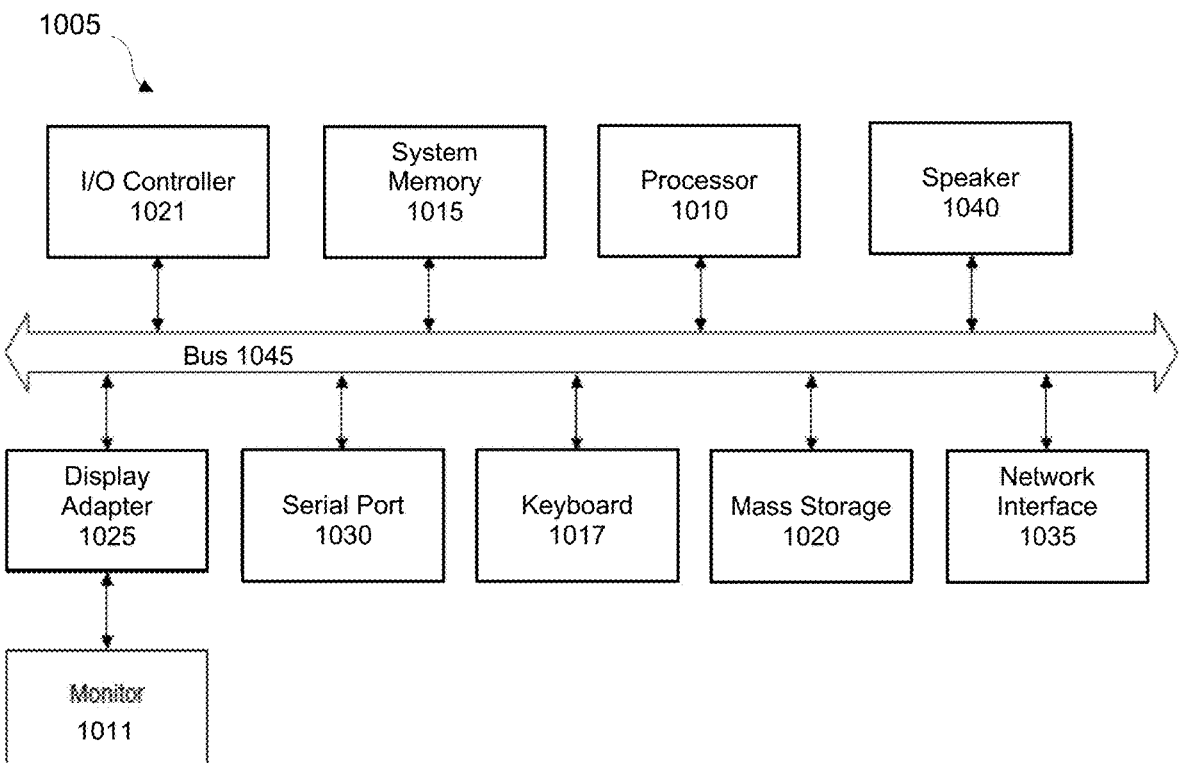
FIG. 17 is a system block diagram of a computer system used to execute one or more software components of certain processes, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 17 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for improving extent-based read performance of a file using data pre-fetches in a client-server network, comprising:

obtaining extent information for delta changes between a first generation backup file and a second generation backup file;

receiving, in a filesystem server and from a client, an instruction to create a new synthesized file corresponding to the extent information;

storing the extent information in a storage comprising part of a deduplication backup process executed by a data storage server running a Data Domain filesystem (DDFS), and wherein the client comprises a DDBoost client;

returning the extent information to the backup process for patching into a target file using a DDBoost application programming interface (API) to read the new synthesized file, wherein the API includes a read buffer with offset/length extent information of data of the new synthesized file; and creating, upon receiving this instruction, a new synthesized file comprising extents of the extent information as contiguous data that can be read sequentially to leverage the benefits of the pre-fetches.

2. The method of claim 1 further comprising patching the extents into the target file that may be stored on different storage using the extent information.

3. The method of claim 1 wherein the extent information comprises a sequence of offsets and lengths, with each offset and length pair defining a corresponding extent of data added to the first generation backup file to synthesize the second generation backup file.

4. The method of claim 3 wherein the pre-fetches move data from the extents into a read-ahead cache to be sent to an application of the client in response to a read request, and further wherein a prefetch generated by a pre-fetch request comprises a hint that a read input/output (I/O) operation is imminent for purposes of filling the read-ahead cache and preventing a need to issue a blocking I/O operation for the read request.

5. The method of claim 4 wherein the benefits of the pre-fetches comprise at least one of: preventing wasted input/output operations created by attempting to pre-fetch data beyond an end of an extent, or failing to pre-fetch any data at a beginning of an extent.

6. The method of claim 3 wherein the sequence of offsets comprise an extent map, with each offset defining a corresponding extent.

7. The method of claim 3 wherein the filesystem includes a multi-streamed restore component providing multiple streams to issue read-ahead operations for the pre-fetches in parallel, and further wherein the pre-fetches move the data into the read-ahead cache using the multiple streams.

8. The method of claim 1 wherein the system comprises a Change Based Tracking (CBT) system, and wherein the delta changes are synthesized into a backup file stored by the application as part of a backup operation.

9. A system for improving read performance of a file using data pre-fetches in a client-server network, comprising:

a server hosting a filesystem storing data in storage for an application executed in the network;

a network client hosting the application;

a backup processing component obtaining extent information for delta changes between a first generation backup file and a second generation backup file;

a data storage server running a Data Domain filesystem (DDFS), and wherein the client comprises a DDBoost client;

a storage storing the extent information in a storage comprising part of a deduplication backup process executed by the data storage server, wherein the extent information is returned to the backup process for patching into a target file using a DDBoost application programming interface (API) to read the new synthesized file, wherein the API includes a read buffer with offset/length extent information of data of the new synthesized file; and a server component receiving, from the network client, an instruction to create a new synthesized file corresponding to the extent information, and creating, upon receiving this instruction, a new synthesized file comprising extents of the extent information as contiguous data that can be read sequentially to leverage the benefits of the pre-fetches.

10. The system of claim 9 further comprising a read-ahead cache, wherein the pre-fetches move data from a prefetched extents into the read-ahead cache to be sent to the application in response to the read request, and further wherein the prefetch comprises a hint that a read input/output (I/O) operation is imminent for purposes of filling the read-ahead cache and preventing a need to issue a blocking I/O operation for the read request, and yet further wherein the benefits of the pre-fetches comprise at least one of: preventing wasted input/output operations created by attempting to pre-fetch data beyond an end of an extent, or failing to pre-fetch any data at a beginning of an extent.

* * * * *